(No Model.)
T. KEYS.
COFFEE POT.
No. 281,373. Patented July 17, 1883.
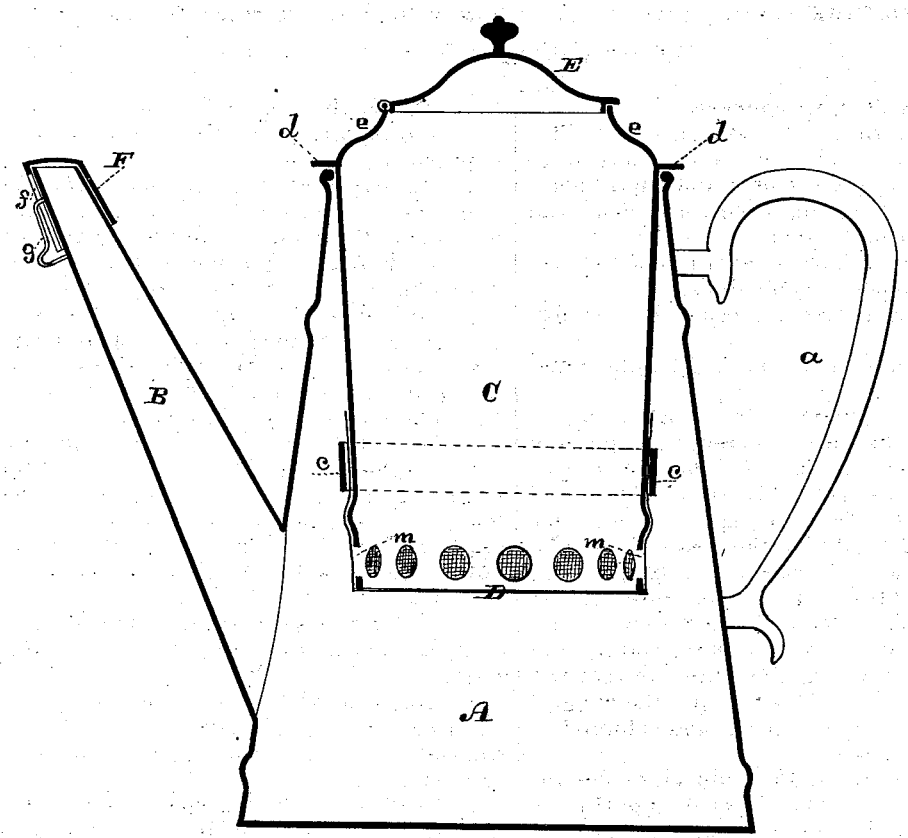
Witnesses,
Geo. H. Strong.
Inventor,
Thos Keys
By Dewey & Co.
Attorneys

UNITED STATES PATENT OFFICE.

THOMAS KEYS, OF CHICAGO, ILLINOIS.

COFFEE-POT.

SPECIFICATION forming part of Letters Patent No. 281,373, dated July 17, 1883.

Application filed May 15, 1883. (No model.)

*To all whom it may concern:*

Be it known that I, THOMAS KEYS, of Chicago, county of Cook, State of Illinois, have invented an Improved Coffee-Pot; and I hereby declare the following to be a full, clear, and exact description thereof.

My invention relates to certain new and useful improvements in coffee-pots.

The figure is a vertical section of my coffee-pot.

A is the main vessel, having handle $a$ and spout B.

C is the coffee-holder. It consists of a cylinder having its base covered by a piece of cloth, D, or other similar substance, to act as a strainer. This is preferably stretched and held to its position by a band or ring, $c$. The holder is adapted to fit within the vessel, and to be suspended therein by means of a flange, $d$, at its top, which fits over the top of vessel A. At the top of the holder is formed a rim, $e$, extending inwardly and upwardly, making the opening or mouth of smaller diameter than the body of the holder. This rim and the flange $d$ are preferably made integral, and soldered to the top of the holder.

E is the lid of the holder, hinged to the upper edge of rim $e$. The object of this rim $e$ is to prevent the grounds from passing out over the top when the pot is held at an inclination to pour out the coffee from the spout. If the top of the pot had no rim of this kind, the grounds would have a tendency to flow out from the holder; but when constructed with the rim the grounds lodge against it and cannot find an escape over the edge. Around the base of the holder, in its sides, are made a number of perforations, $m$. These are covered by the cloth D, as it extends up on the sides. The object of this construction is to expose as great a surface of the ground coffee to the action of the water as possible and to permit the water to permeate the mass with better effect and more thoroughly than if the bottom alone were exposed to its action.

F is the cap or cover for the end of the spout. It has a slot, $f$, in its side. Soldered to the under side of the spout is a piece of wire, forming a guide-fastening, $g$, for the cover or cap F, which fits it by means of its slot, $f$. When the cap is raised to the limit of its slot, it is high enough to clear the edge of the spout in turning from it. When free of it, the cap may be dropped, and it will fall down on the guide-fastening $g$ and be there suspended. To replace it, it is raised to the top of the guide-fastening, turned over on the spout, and fitted down to its place. This arrangement furnishes a cover for the spout, which may be readily applied, and when not in use will still be at hand without being liable to be lost or to be misplaced.

Having thus described my invention, what I claim as new, and desire to secure by Letters Patent, is—

1. In a coffee-pot, the coffee-holder C, having an inwardly-extending rim, $e$, at its top, substantially as and for the purpose herein described.

2. The vessel A, having spout B, in combination with the coffee-holder C, having an inwardly-extending rim, $e$, at its top, substantially as and for the purpose herein described.

3. In combination with the spout of a vessel, the cover or cap F for its end, having slot $f$ and the guide-fastening $g$ secured to the spout, and engaging with the slotted cap, substantially as and for the purpose herein described.

In witness whereof I hereunto set my hand.

THOMAS KEYS.

Witnesses:
F. JOHNSON,
CHAS. KRESSMANN.